United States Patent
Zheng

(10) Patent No.: US 9,116,043 B2
(45) Date of Patent: Aug. 25, 2015

(54) AMBIENT LIGHT SENSORS WITH PHOTODIODE LEAKAGE CURRENT COMPENSATION

(71) Applicant: Apple Inc., Cupertino, CA (US)

(72) Inventor: Dong Zheng, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/845,641

(22) Filed: Mar. 18, 2013

(65) Prior Publication Data

US 2014/0267202 A1  Sep. 18, 2014

(51) Int. Cl.
*G01J 1/42* (2006.01)
*G09G 5/10* (2006.01)
*G01J 1/10* (2006.01)

(52) U.S. Cl.
CPC .......... *G01J 1/4204* (2013.01); *G01J 1/10* (2013.01); *G09G 5/10* (2013.01)

(58) Field of Classification Search
CPC ............... G09G 2360/144; G09G 2360/16; H04N 1/00997; H04N 1/00835
USPC ............... 345/207, 175; 250/214 AL, 214; 348/227.1, 336, 602
See application file for complete search history.

(56) References Cited

U.S. PATENT DOCUMENTS

| | | | |
|---|---|---|---|
| 6,157,024 A | 12/2000 | Chapdelaine et al. | |
| 6,206,299 B1 * | 3/2001 | Mann et al. | 239/69 |
| 7,329,850 B2 * | 2/2008 | Drummond et al. | 250/214 C |
| 7,531,776 B2 | 5/2009 | Koide | |
| 7,554,073 B2 | 6/2009 | Lum et al. | |
| 7,714,265 B2 | 5/2010 | Fadell et al. | |
| 8,174,486 B2 | 5/2012 | Woo | |
| 8,242,430 B2 | 8/2012 | Dyer | |
| 8,243,278 B2 * | 8/2012 | Valois | 356/448 |
| 2002/0074499 A1 | 6/2002 | Butler | |
| 2006/0017589 A1 * | 1/2006 | Jo | 341/13 |
| 2006/0149607 A1 * | 7/2006 | Sayers et al. | 705/7 |
| 2009/0157567 A1 * | 6/2009 | Sayers et al. | 705/412 |
| 2009/0302781 A1 * | 12/2009 | Peker et al. | 315/297 |
| 2010/0060562 A1 * | 3/2010 | Hadwen et al. | 345/102 |
| 2011/0068255 A1 | 3/2011 | Zheng et al. | |
| 2012/0119071 A1 * | 5/2012 | Drummond et al. | 250/214 AL |
| 2012/0280625 A1 * | 11/2012 | Zampini et al. | 315/151 |
| 2013/0048835 A1 * | 2/2013 | Drummond et al. | 250/208.2 |

(Continued)

OTHER PUBLICATIONS

Zheng, U.S. Appl. No. 13/678,349, filed Nov. 15, 2012.

*Primary Examiner* — Ricardo L Osorio
(74) *Attorney, Agent, or Firm* — Treyz Law Group; Jason Tsai; Joseph F. Guihan

(57) ABSTRACT

An electronic device may have a display with a brightness that is adjusted based on data gathered from one or more ambient light sensors (ALSs). In one suitable arrangement, an ALS may include a photodiode, a temperature sensor, a scaler, an analog-to-digital converter (ADC), and a subtractor. The subtractor may have a first input coupled to the photodiode via the ADC, a second input coupled to the temperature sensor via the scaler, and an output on which a leakage-compensated sensor output is provided. In another suitable arrangement, the ALS may include first and second photodiodes, a light blocking layer formed over the second photodiode, a scaler, and a subtractor. The subtractor may have a first input coupled to the first photodiode, a second input coupled to the second photodiode via the scaler, and an output on which a leakage-compensated sensor output is provided.

12 Claims, 11 Drawing Sheets

(56) References Cited

U.S. PATENT DOCUMENTS

| | | | |
|---|---|---|---|
| 2014/0014839 A1* | 1/2014 | Chang et al. | 250/338.4 |
| 2014/0062297 A1* | 3/2014 | Bora et al. | 315/34 |
| 2014/0070078 A1* | 3/2014 | Land et al. | 250/214.1 |
| 2014/0117215 A1* | 5/2014 | Xu et al. | 250/214 |
| 2014/0132578 A1* | 5/2014 | Zheng | 345/207 |
| 2014/0152188 A1* | 6/2014 | Bora et al. | 315/210 |
| 2014/0215246 A1* | 7/2014 | Lee et al. | 713/323 |

\* cited by examiner

AMBIENT LIGHT SENSORS WITH PHOTODIODE LEAKAGE CURRENT COMPENSATION

BACKGROUND

This relates to sensors and, more particularly, to ambient light sensors for electronic devices.

Cellular telephones and other portable devices with displays such a tablet computers sometimes contain ambient light sensors. An ambient light sensor can detect when a portable device is in a bright light environment. For example, an ambient light sensor can detect when a portable device is exposed to direct sunlight. When bright light is detected, the portable device can automatically increase the brightness level of the display to ensure that images on the display remain visible and are not obscured by the presence of the bright light. In dark surroundings, the display brightness level can be reduced to save power and provide a comfortable reading environment.

The fundamental limitation to ambient light sensor sensitivity is photo sensor leakage current (or "dark" current). With conventional devices, ambient light sensors can be implemented using first and second silicon photosensors (i.e., two photodiodes). The first photodiode is exposed to ambient light, whereas the second photodiode is a metal-covered photodiode that does not receive any ambient light. The first photodiode is used to measure a total current while the second photodiode is used to measure a leakage current. The leakage current is subtracted from the total current to compute a final leakage-current-compensated output value.

Computing leakage-current-compensated light levels in this way, however, is costly. In this conventional approach, the first and second photodiodes are of the same size (i.e., each of the first and second photodiodes take up the same amount of area on an integrated circuit substrate). A single photodiode can be at least 100,000 times larger than a single transistor (as an example). The use of two photosensors of the same size therefore takes up a significant amount of die area.

It would therefore be desirable to be able to provide ambient light sensors with reduced area requirements for electronic devices.

SUMMARY

An electronic device may have a display with a brightness that is adjusted based on ambient light data gathered from one or more ambient light sensors. The electronic device may be operated in an environment in which the electronic device is exposed to ambient light.

In one suitable arrangement, the ambient light sensor may include a photosensitive element (e.g., a photodiode) and a temperature sensor. The ambient light sensor may be configured to generate a leakage-compensated ambient light sensor output signal based on information gathered from the photodiode and the temperature sensor. The ambient light sensor may also include a scaler circuit, an analog-to-digital converter (ADC), a subtraction circuit, and a one-time programming (OTP) or other non-volatile memory block. The scaler circuit may be used to receive a temperature sensor output signal from the temperature sensor and to produce a corresponding scaler output signal based on the temperature sensor output signal.

The ADC may have an input that is coupled to the photodiode and an output on which a corresponding total current signal is provided. The subtraction circuit may have a first input configured to receive the total current signal from the ADC, a second input configured to receive the scaler output signal from the scaler circuit, and an output on which the leakage-compensated ambient light sensor output signal is provided. If desired, a switching circuit may be coupled between the scaler circuit and the second input of the subtraction circuit, where the scaler circuit is turned off during calibration operations and is turned on during normal operation.

In another suitable arrangement, the ambient light sensor may include a first photodiode and a second photodiode that is smaller than the first photodiode. A light blocking layer may be formed over the second (smaller) photodiode so that the second photodiode is prevented from receiving ambient light. The ambient light sensor may include a subtraction circuit having a first input, a second input, and an output, a first data converter coupled between the first photodiode and the first input of the subtraction circuit, a second data converter coupled between the second photodiode and the second input of the subtraction circuit, and a scaler circuit interposed between the second data converter and the second input of the subtraction circuit. Configured in this way, the subtraction circuit may receive at its first input a total current signal from the first data converter, may receive at its second input a scaled leakage current signal from the scaler circuit, and may generate at its output a leakage-compensated ambient light sensor signal (e.g., a signal that is generated by computing the difference between the total current signal and the scaled leakage current signal).

In yet another suitable arrangement, the ambient light sensor having the first and second/smaller photodiodes may include a subtraction circuit having a first input, a second input, and an output, a shared data converter (e.g., a shared analog-to-digital converter) having an input that is switchably coupled to a selected one of the first and second photodiodes and an output, and first and second data storage elements. The first input of the subtraction circuit may be switchably coupled to the shared data converter via the first data storage element, whereas the second input of the subtraction circuit may be switchably coupled to the shared data converter via the second data storage element and a scaler circuit. Configured in this way, the subtraction circuit may receive at its first input a total current signal from the first data storage element, may receive at its second input a scaled leakage current signal from the scaler circuit, and may generate at its output a leakage-compensated ambient light sensor signal. In particular, the ambient light sensor may compute a total ambient light level during a first time period and may compute a leakage level during a second time period that is different than the first time period in a time-multiplexed fashion.

In yet another suitable arrangement, the ambient light sensor having the first and second/smaller photodiodes may include an analog current subtraction circuit having a first input that is coupled to the first photodiode, a second input that is coupled to the second photodiode, and an output, an analog current scaling circuit (e.g., an analog current mirror circuit) interposed between the second photodiode and the second input of the analog current subtraction circuit, and a data converter that is coupled to the output of the analog current subtraction circuit. Configured in this way, the analog current subtraction circuit may receive at its first input a total current signal directly from the first photodiode, may receive at its second input a scaled leakage current signal from the analog current scaler, and may generate at its output a leakage-compensated current signal.

Further features of the present invention, its nature and various advantages will be more apparent from the accompanying drawings and the following detailed description.

DETAILED DESCRIPTION

Figure 1:
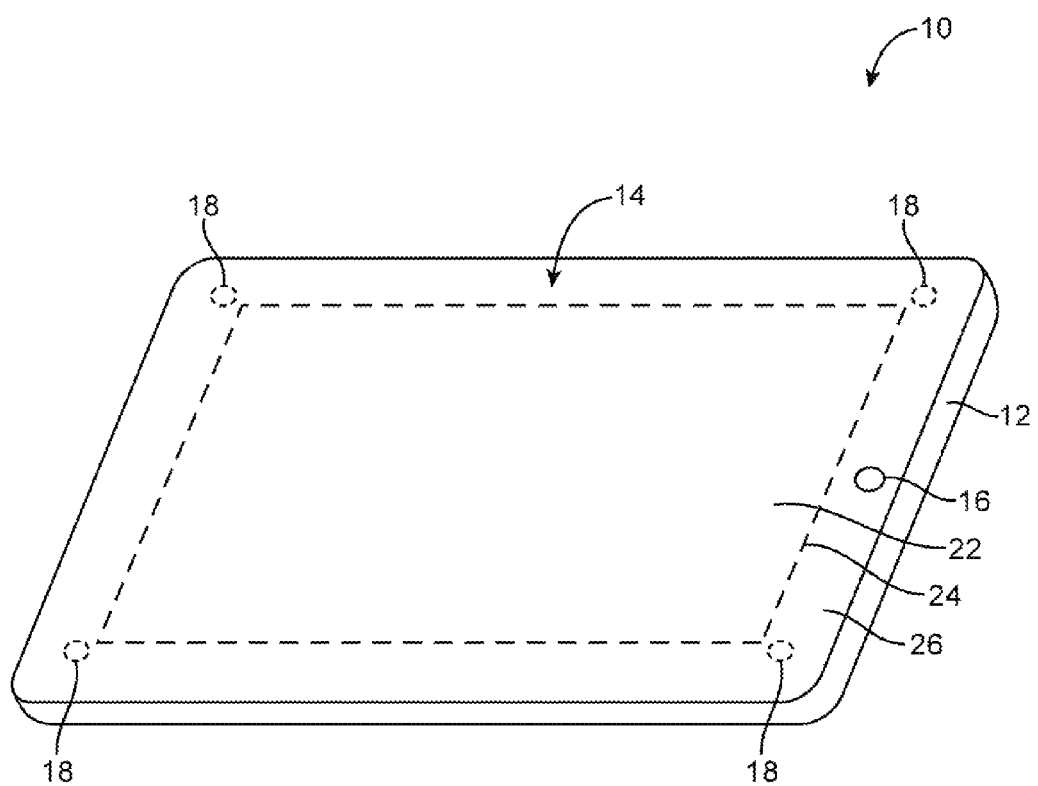
FIG. 1 is a perspective view of an illustrative electronic device with ambient light sensor structures in accordance with an embodiment of the present invention.

Electronic devices such as device 10 of FIG. 1 may be provided with an ambient light sensor system. The ambient light sensor system may use readings from one or more ambient light sensors to determine the brightness level of the ambient environment. Ambient brightness level information may be used by the electronic device in controlling display brightness. For example, in response to determining that ambient light levels are high, an electronic device may increase display brightness to ensure that images on the display remain visible to the user.

Device 10 of FIG. 1 may be a portable computer, a tablet computer, a computer monitor, a handheld device, global positioning system equipment, a gaming device, a cellular telephone, portable computing equipment, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials.

Housing 12 may be formed using an unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the rear of device 10 may be formed from a planar housing structure such as a planar glass member, a planar plastic member, a planar metal structure, or other substantially planar structure. The edges (sidewalls) of housing 12 may be straight (vertical) or may be curved (e.g., housing 12 may be provided with sidewalls formed from rounded extensions of a rear planar housing wall).

As shown in FIG. 1, the front of device 10 may include a display such as display 14. The surface of display 14 may be curved or planar. With one suitable arrangement, the surface of display 14 may be covered with a cover layer. The cover layer may be formed from a layer of clear glass, a layer of clear plastic, or other transparent materials (e.g., materials that are transparent to visible light and that are generally transparent to infrared light). The cover layer that covers display 14 may sometimes be referred to as a display cover layer, display cover glass, or plastic display cover layer.

Display 14 may, for example, be a touch screen that incorporates capacitive touch electrodes or a touch sensor formed using other types of touch technology (e.g., resistive touch, light-based touch, acoustic touch, force-sensor-based touch, etc.). Display 14 may include image pixels formed from light-emitting diodes (LEDs), organic LEDs (OLEDs), plasma cells, electronic ink elements, liquid crystal display (LCD) components, or other suitable image pixel structures.

Display 14 may have an active region and an inactive region. Active region 22 of display 14 may lie within rectangular boundary 24. Within active region 22, display pixels such as liquid crystal display pixels or organic light-emitting diode display pixels may display images for a user of device 10. Active display region 22 may be surrounded by an inactive region such as inactive region 26. Inactive region 26 may have the shape of a rectangular ring surrounding active region 22 and rectangular boundary 24 (as an example). To prevent a user from viewing internal device structures under inactive region 26, the underside of the cover layer for display 14 may be coated with an opaque masking layer in inactive region 26. The opaque masking layer may be formed from a layer of ink (e.g., black or white ink or ink of other colors), a layer of plastic, or other suitable opaque masking material.

Device 10 may include input-output ports, buttons, sensors, status indicator lights, speakers, microphones, and other input-output components. As shown in FIG. 1, for example, device 10 may include one or more openings in inactive region 26 of display 14 to accommodate buttons such as button 16. Device 10 may also have openings in other portions of display 14 and/or housing 12 to accommodate input-output ports, speakers, microphones, and other components.

Ambient light sensors may be mounted at any locations within device 10 that are potentially exposed to ambient light. For example, one or more ambient light sensors may be mounted behind openings or other windows in housing 12 (e.g., clear windows or openings in a metal housing, clear windows or openings in a plastic housing, etc.). With one suitable arrangement, one or more ambient light sensors may be formed in device 10 on portions of display 14. For example, one or more ambient light sensors may be mounted to a thin-film transistor layer or other display layer that is located under a display cover layer in inactive region 26 of display 14, as shown by illustrative ambient light sensor locations 18 in FIG. 1.

Ambient light sensors may be mounted under ambient light sensor windows in the opaque masking layer in inactive region 26 or may be mounted in other locations in device 10 that are exposed to ambient light. In configurations in which ambient light sensors are mounted under region 26 of display 14, ambient light sensor windows for the ambient light sensors may be formed by creating circular holes or other openings in the opaque masking layer in region 26. Ambient light sensor windows may also be formed by creating localized regions of material that are less opaque than the remaining opaque masking material or that otherwise are configured to allow sufficiently strong ambient light signals to be detected. For example, ambient light sensor windows may be created by locally thinning portions of an opaque masking layer or by depositing material in the ambient light sensor windows that is partly transparent. During operation, ambient light from the exterior of device 10 may pass through the ambient light sensor windows to reach associated ambient light sensors in the interior of device 10.

The ambient light sensors that are used in device 10 may be formed from silicon or other semiconductors. Ambient light sensors may be mounted on one or more substrates within device 10. With one suitable arrangement, ambient light sensors are formed from a semiconductor such as silicon and are mounted on a substrate layer that is formed from one of the layers in display 14. Other types of ambient light sensors and/or mounting arrangements may be used if desired. The use of silicon ambient light sensors that are mounted on a display substrate layer is merely illustrative.

Figure 2:
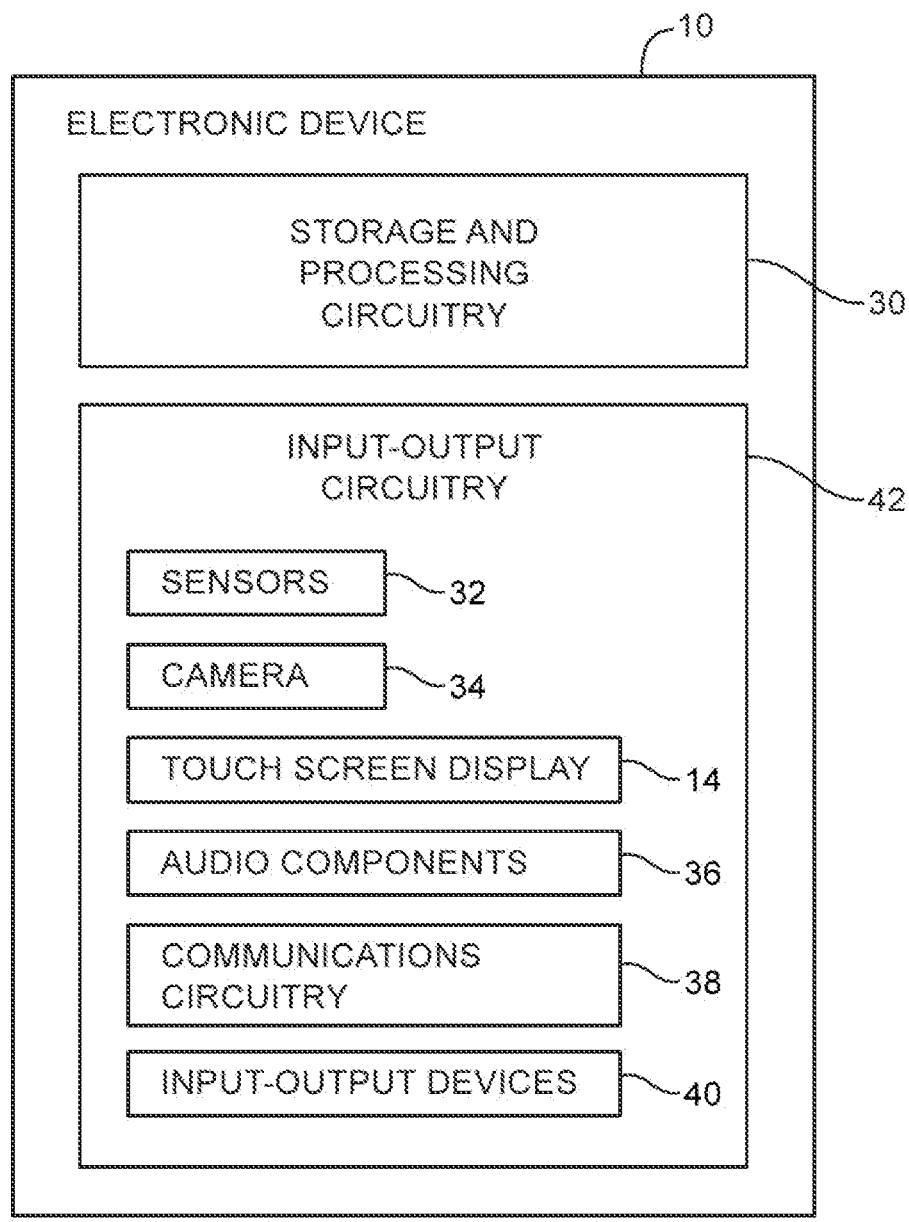
FIG. 2 is a schematic diagram of an illustrative electronic device with ambient light sensor structures in accordance with an embodiment of the present invention.

A schematic diagram of an illustrative electronic device such as electronic device 10 of FIG. 1 is shown in FIG. 2. As shown in FIG. 2, electronic device 10 may include control circuitry such as storage and processing circuitry 30. Storage and processing circuitry 30 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 30 may be used to control the operation of device 10. This processing circuitry may be based on one or more microprocessors, microcontrollers, digital signal processors, baseband processors, power management units, audio codec chips, application specific integrated circuits, display driver integrated circuits, etc.

Storage and processing circuitry 30 may be used to run software on device 10 such as internet browsing applications, voice-over-internet-protocol (VOIP) telephone call applications, email applications, media playback applications, operating system functions, etc. The software may be used to implement control operations such as real time display brightness adjustments or other actions taken in response to measured ambient light data. Circuitry 30 may, for example, be configured to implement a control algorithm that controls the gathering and use of ambient light sensor data from ambient light sensors located in regions such as regions 18 of FIG. 1. Arrangements for device 10 that include a single ambient light sensor may reduce cost and complexity. Arrangements for device 10 that include multiple ambient light sensors may allow control circuitry 30 to discard or otherwise diminish the impact of ambient light sensor data that is gathered from ambient light sensors that are shadowed (and that are therefore producing erroneous or less valuable light readings).

Input-output circuitry 42 may be used to allow data to be supplied to device 10 and to allow data to be provided from device 10 to external devices. Input-output circuitry 42 may include sensors 32 and at least one camera module 34. Sensors 32 may include ambient light sensors, proximity sensors, touch sensors (e.g., capacitive touch sensors that are part of a touch screen display or that are implemented using stand-alone touch sensor structures), accelerometers, and other sensors. Camera module 34 may include an image sensor, a corresponding lens system, and an associated flash unit that can be used to acquire images for a user during operation of device 10.

Input-output circuitry 42 may also include one or more displays such as display 14. Display 14 may be a liquid crystal display, an organic light-emitting diode display, an electronic ink display, a plasma display, a display that uses other display technologies, or a display that uses any two or more of these display configurations. Display 14 may include an array of touch sensors (i.e., display 14 may be a touch screen). The touch sensors may be capacitive touch sensors formed from an array of transparent touch sensor electrodes such as indium tin oxide (ITO) electrodes or may be touch sensors formed using other touch technologies (e.g., acoustic touch, pressure-sensitive touch, resistive touch, etc.).

Audio components 36 may be used to provide device 10 with audio input and output capabilities. Examples of audio components that may be included in device 10 include speakers, microphones, buzzers, tone generators, and other components for producing and detecting sound.

Communications circuitry 38 may be used to provide device 10 with the ability to communicate with external equipment. Communications circuitry 38 may include analog and digital input-output port circuitry and wireless circuitry based on radio-frequency signals and/or light.

Device 10 may also include a battery, power management circuitry, and other input-output devices 40. Input-output devices 40 may include buttons, joysticks, click wheels, scrolling wheels, touch pads, key pads, keyboards, cameras, light-emitting diodes and other status indicators, etc.

A user can control the operation of device 10 by supplying commands through input-output circuitry 42 and may receive status information and other output from device 10 using the output resources of input-output circuitry 42. Using ambient light sensor readings from one or more ambient light sensors in sensors 32, storage and processing circuitry 30 can automatically take actions in real time such as adjusting the brightness of display 14, adjusting the brightness of status indicator light-emitting diodes in devices 40, adjusting the colors or contrast of display 14 or status indicator lights, etc.

Figure 3:
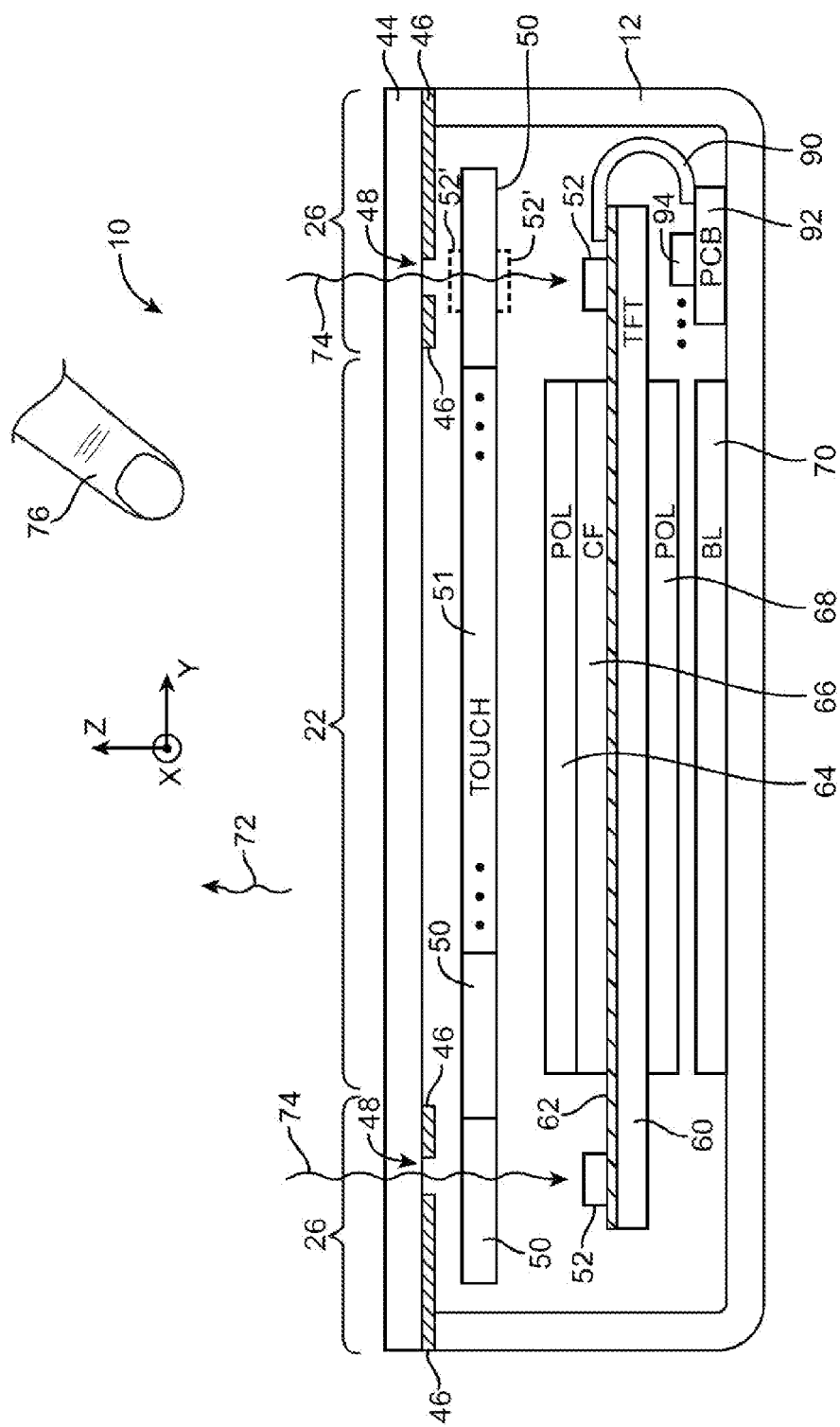
FIG. 3 is a cross-sectional side view of an illustrative electronic device having a display layer such as a thin-film-transistor layer with ambient light sensor structures in accordance with an embodiment of the present invention.

FIG. 3 is a cross-sectional side view of device 10. As shown in FIG. 3, device 10 may include a display such as display 14. Display 14 may have a cover layer such as cover layer 44. Cover layer 44 may be formed from a layer of glass, a layer of plastic, or other transparent material. If desired, the functions of cover layer 44 may be performed by other display layers (e.g., polarizer layers, anti-scratch films, color filter layers, etc.). The arrangement of FIG. 3 is merely illustrative.

Display structures that are used in forming images for display 14 may be mounted under active region 22 of display 14. In the example of FIG. 3, display 14 has been implemented using liquid crystal display structures. If desired, display 14 may be implemented using other display technologies. The use of a liquid crystal display in the FIG. 3 example is merely illustrative.

The display structures of display 14 may include a touch sensor array such as touch sensor array 51 for providing display 14 with the ability to sense input from an external object such as external object 76 when external object 76 is in the vicinity of a touch sensor on array 51. With one suitable arrangement, touch sensor array 51 may be implemented on a clear dielectric substrate such as a layer of glass or plastic and may include an array of indium tin oxide electrodes or other clear electrodes such as electrodes 50. The electrodes may be used in making capacitive touch sensor measurements.

Display 14 may include a backlight unit such as backlight unit 70 for providing backlight 72 that travels vertically upwards in dimension Z through the other layers of display 14. The display structures may also include upper and lower polarizers such as lower polarizer 68 and upper polarizer 64.

Color filter layer 66 and thin-film transistor layer 60 may be interposed between polarizers 68 and 64. A layer of liquid crystal material may be placed between color filter layer 66 and thin-film transistor layer 60.

Color filter layer 66 may contain a pattern of colored elements for providing display 14 with the ability to display colored images. Thin-film transistor layer 60 may include pixel structures for applying localized electric fields to the liquid crystal layer. The localized electric fields may be generated using thin-film transistors and associated electrodes that are formed on a clear substrate such as a glass or plastic substrate. The electrodes and other conductive structures on thin-film transistors layer 60 may be formed from metal (e.g., aluminum) and transparent conductive material such as indium tin oxide. In the FIG. 3 example, thin-film transistors (e.g., polysilicon transistors or amorphous silicon transistors) and associated conductive patterns are shown as structures 62.

One or more ambient light sensors 52 may be provided in device 10. As shown in FIG. 3, ambient light sensors 52 may be mounted within device 10 by coupling ambient light sensors 52 to traces in structures 62 on thin-film transistor layer 60. If desired, ambient light sensors 52 may be mounted on other layers of display 14. For example, dashed lines 52' show how ambient light sensors may be mounted to a display layer such as touch sensor layer 51. Ambient light sensors in device 10 may also be mounted to cover layer 44, a polarizer layer, a color filter layer, a backlight structure layer, or any other suitable display layer. Ambient light sensors in device 10 may also be mounted on printed circuit board substrates (e.g. flexible printed circuits and/or rigid printed circuit boards), if desired. Illustrative configurations in which ambient light sensors 52 are mounted on thin-film transistor layer 60 are sometimes described herein as an example.

Indium tin oxide traces or other conductive patterned traces that are formed on thin-film transistor layer 60 may form electrical paths that are connected to leads in ambient light sensors 52. For example, one or more contacts such as gold pads or pads formed from other metals may be attached to indium tin oxide traces or metal traces using anisotropic conductive film (ACF) or other conductive adhesive. Solder connections, welds, connections formed using connectors, and other electrical interconnect techniques may be used to mount ambient light sensors 52 to thin-film transistor layer 60 if desired.

An opaque masking layer such as opaque masking layer 46 may be provided in inactive region 26. The opaque masking layer may be used to block internal device components from view by a user through peripheral edge portions of clear display cover layer 44. The opaque masking layer may be formed from black ink, black plastic, plastic or ink of other colors, metal, or other opaque substances. Ambient light sensor windows such as windows 48 may be formed in opaque masking layer 46. For example, circular holes or openings with other shapes may be formed in layer 46 to serve as ambient light sensor windows 48. Ambient light sensor windows 48 may, if desired, be formed in locations such as locations 18 of FIG. 1.

If desired, a flexible printed circuit ("flex circuit") cable such as cable 90 may be used to interconnect traces 62 on thin-film transistor layer 60 to additional circuitry in device 10 (e.g., storage and processing circuitry 30 of FIG. 2). Flex circuit cable 90 may, for example, be used to interconnect ambient light sensors 52, a driver integrated circuit on thin-film transistor layer 60, and thin-film transistor circuitry on thin-film transistor layer 60 to circuitry on a substrate such as printed circuit 92. The circuitry on substrate 92 may include integrated circuits and other components 94 (e.g., storage and processing circuitry 30 of FIG. 2).

During operation of device 10, ambient light 74 may pass through ambient light sensor windows 48 and may be detected using ambient light sensors 52. Signals from ambient light sensors 52 may be routed to analog-to-digital converter circuitry that is implemented within the silicon substrates from which ambient light sensors 52 are formed, to analog-to-digital converter circuitry that is formed on thin-film-transistor layer 60 or that is formed in an integrated circuit that is mounted to thin-film transistor layer 60, or to analog-to-digital converter circuitry and/or other control circuitry located elsewhere in device 10 such as one or more integrated circuits in storage and processing circuitry 30 of FIG. 2 (e.g., integrated circuits containing analog-to-digital converter circuitry for digitizing analog ambient light sensor signals from sensors 52 such as integrated circuits 94 on substrate 92).

If desired, ambient light sensor(s) 52 may be implemented as part of a silicon device that has additional circuitry (i.e., ambient light sensors 52 may be implemented as integrated circuits). An ambient light sensor with this type of configuration may be provided with built-in analog-to-digital converter circuitry and communications circuitry so that digital light sensor signals can be routed to a processor using a serial interface or other digital communications path.

In general, ambient light sensors detect the amount of available light using photodiodes to generate current in response to receiving incoming photons. Ideally, photodiodes generate zero leakage current. In practice, however, photodiodes may exhibit some amount of leakage current. The amount of leakage current associated with a photodiode sets the minimum sensitivity of that photodiode (i.e., photodiode sensitivity is limited by the amount of photodiode leakage).

Figure 4:
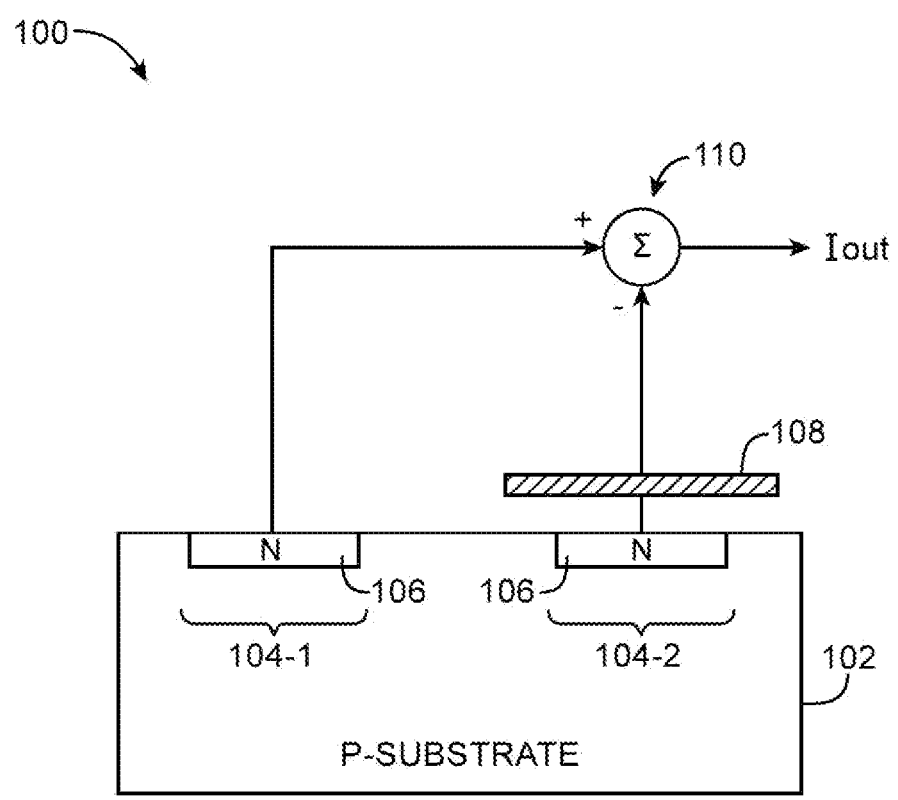
FIG. 4 is a diagram of a conventional ambient light sensor.

In an effort to overcome this limitation, ambient light sensors with two identical photodiodes have been developed (see, FIG. 4). FIG. 4 is a diagram of a conventional ambient light sensor 100 that includes a first photodiode 104-1 and a second photodiode 104-2. Each of photodiodes 104-1 and 104-2 includes an N-type region 106 formed in a P-type silicon substrate 102. Photodiodes 104-1 and 104-2 are of the same size (i.e., region 106 of photodiode 104-1 and region 106 of photodiode 104-2 occupy the same amount of die area).

A metal cover 108 is formed over second photodiode 104-2 so that the second photodiode does not receive any ambient light. Configured in this way, first photodiode 104-1 generates a first amount of current that is representative of the amount of ambient light while second photodiode 104-2 generates a second amount of current that is representative of the amount of leakage current associated with photodiode 104-2. Since photodiodes 104-1 and 104-2 are equal in size, it can be assumed that the amount of leakage associated with photodiode 104-1 is approximately equal to the amount of leakage associated with photodiode 104-2.

As a result, a final leakage-compensated output Iout can be computed by subtracting the second amount of current from the first amount of current using a current subtraction circuit 110. In other words, Iout does not contain any leakage component since the leakage component has been cancelled out by the subtraction operation. Performing leakage compensation using the implementation of FIG. 4, however, is costly since the size of two identical photodiodes takes up a substantial amount of die area. Each photodiode may be at least 200,000 times bigger than a single metal-oxide-semiconductor field-effect transistor (as an example). It would therefore be desirable to provide an ambient light sensor with reduced area.

Figure 5:
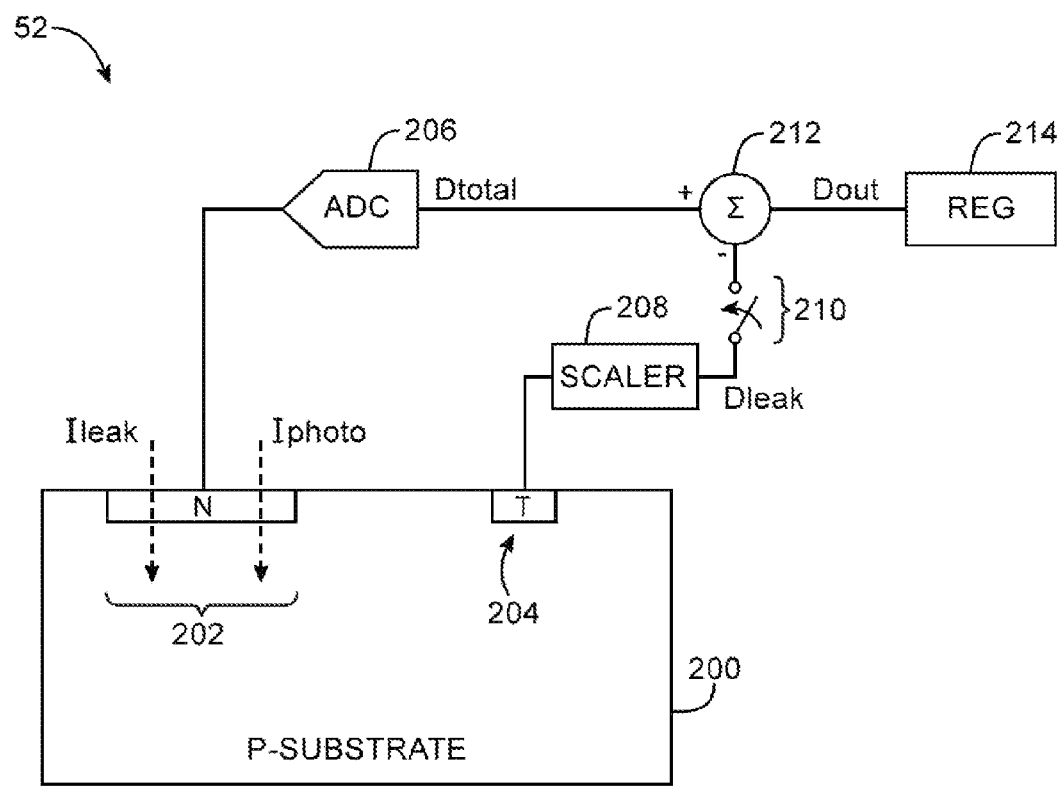
FIG. 5 is a diagram of an illustrative ambient light sensor that includes a temperature sensor in accordance with an embodiment of the present invention.

FIG. 5 shows one suitable arrangement of ambient light sensor 52. As shown in FIG. 5, ambient light sensor 52 may include a photosensitive element such as photodiode 202 and a temperature sensing circuit such as temperature sensor 204. Photodiode 202 and temperature sensor 204 may both be formed in a semiconductor substrate such as P-type substrate 200. Photodiode 202 may be used to generate a total current that includes current Iphoto and current Ileak. Current Iphoto may represent the amount of current that is generated by photodiode 202 in response to receiving incoming photons, whereas Ileak represents the amount of leakage current (sometimes referred to as "dark" photodiode current) associated with photodiode 202 when there is no incoming photons. As described previously, the sensitivity of ambient light sensor 52 may be limited by the amount of Ileak associated with photodiode 202.

Figure 6:
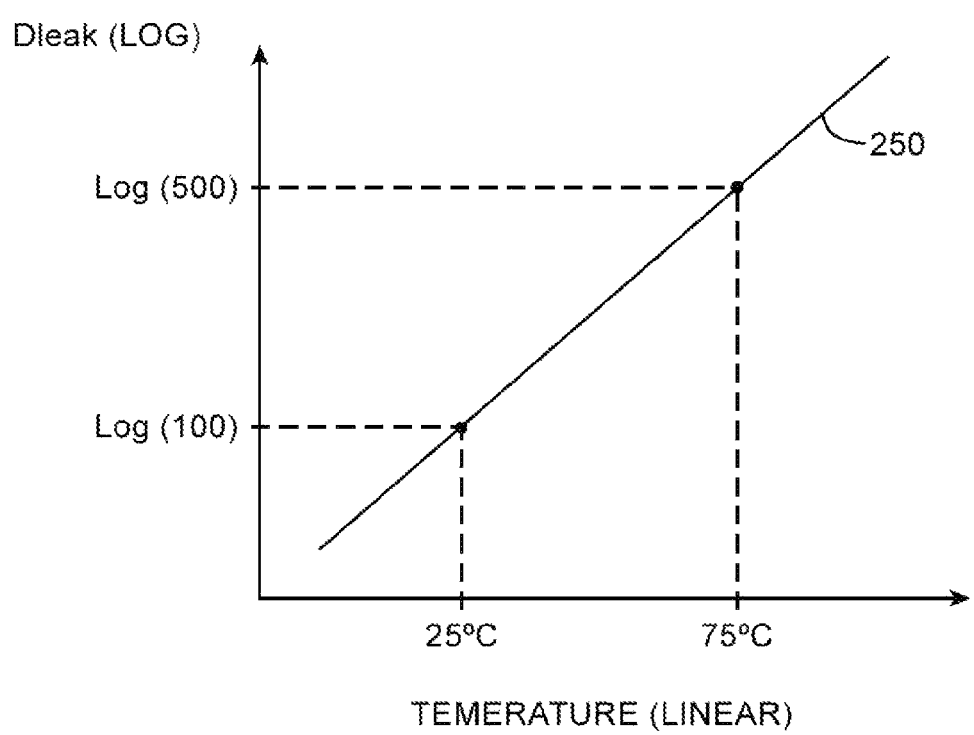
FIG. 6 is a diagram illustrating how photodiode leakage currents can vary as a function of temperature in accordance with an embodiment of the present invention.

One way of removing the contribution of Ileak from the total photodiode current is via the use of temperature sensor 204. This is based on the fact that leakage current has a deterministic exponential dependency on temperature (see, e.g., FIG. 6). FIG. 6 plots leakage level (on a logarithmic scale) as a function of temperature (on a linear scale). As shown by line 250 in FIG. 6, photodiode leakage level exhibits an exponential temperature dependency (e.g., the relationship between photodiode leakage and temperature can be represented by a linear curve such as line 250 on a half-log plot).

In particular, the y-axis of the plot of FIG. 6 represents the digital equivalent of the photodiode leakage (indicated as Dleak) on a logarithmic scale. For example, Dleak may be the value (or digital code) that is generated at the output of an analog-to-digital converter that receives only dark current Ileak at its input. In the exemplary scenario of FIG. 6, a Dleak value of Log(100) may be observed when the temperature of ambient light sensor 52 is equal to 25° C. while a Dleak value of Log(500) may be observed when the temperature of ambient light sensor 52 is equal to 75° C.

Other Dleak values may be interpolated or extrapolated based on these two observed data points (e.g., any given temperature reading will produce a corresponding Dleak value that falls on line 250 without actually having to characterize Ileak at the given temperature). Consider a scenario in which temperature sensor 204 outputs a temperature reading (or temperature sensor output signal) having a value of 50° C. Dleak can be directly computed by interpolating characteristic curve 250. In this example, the interpolated value of Dleak is equal to $10^{([Log(100)+Log(500)]/2)}$ by calculating the midpoint of the two data points (since 50° C. falls halfway between 25° C. and 75° C.). If desired, Dleak values corresponding to other temperature sensor readings may also be computed in this way.

A characteristic curve 250 can therefore be obtained based on photodiode dark current measurements at two different temperature levels. Steps associated with obtaining characteristic curve 250 based on measurements at two different temperatures may therefore sometimes be referred to as two-point calibration.

In some scenarios, however, the slope of curve 250 will always be constant (although curve 250 can be shifted up or down depending on process variations). In scenarios in which the slope of curve 250 is constant or known, photodiode dark current measurements need only be obtained at one temperature level. This type of calibration that involves measuring photodiode leakage at only one temperature level is sometimes referred to as one-point calibration. When performing one-point calibration, the single leakage current measurement may be performed at higher temperature levels (e.g., at 75° C. as opposed to 25° C. for improved accuracy). In general, calibration operations are performed in the dark where no ambient light is present (i.e., photodiode 202 only generates Ileak, and Iphoto is negligible). Either two-point calibration or one-point calibration operations may be performed to characterize the leakage behavior of photodiode 202. In either scenario, the measurements obtained during calibration can be stored in non-volatile memory (e.g., fuses, antifuses, electrically-programmable read-only memory elements, etc.) within ambient light sensor 52.

Temperature sensor 204 may take up much less substrate area compared to a photodiode. For example, temperature sensor may be at least 100 times smaller than photodiode 202, at least 1000 times smaller than photodiode 202, or at least 10000 times smaller than photodiode 202. Referring back to FIG. 5, photodiode 202 may be coupled to a data converting circuit such as analog-to-digital converter (ADC) 206, whereas temperature sensor 204 may be coupled to a scaling circuit such as digital scaler 208.

Analog-to-digital converter 206 may have an input that senses the total current generated by photodiode 202 and an output on which corresponding digital code Dtotal is provided. Scaler 208 may have an input that receives a given temperature reading from temperature sensor 204 and an output on which a corresponding scaler output signal Dleak is generated. Scaler 208 may compute a Dleak value based on the calibration measurements stored in the non-volatile memory and the given temperature reading (e.g., Dleak may be generated by interpolating or extrapolating from the calibration data point(s)). In other words, scaler 208 may be used to implement a digital scaler algorithm that outputs a desired Dleak code which corresponds to the currently measured temperature reading. The digital scaler algorithm may generate the Dleak code based on a look-up table (LUT) or formula (e.g., based on a LUT or formula derived from the measurements obtained during calibration operations). If the one-point calibration is used, a predetermined slope factor may be hard-wired in the digital scaler algorithm.

Analog-to-digital converter 206 and digital scaler 208 may be coupled to a subtraction circuit such as digital subtractor 212. Subtractor 212 may have a first (positive) input configured to receive Dtotal from ADC 206, a second (negative) input configured to receive Dleak from scaler 208 via switching circuit 210, and an output on which Dout is generated. Signal Dout may be computed by subtracting Dleak from Dtotal (i.e., Dout=Dtotal−Dleak). Switching circuit 210 may be a digitally-controlled switch that is turned off during calibration and turned on during normal operation. Placing switch 210 in the off state (i.e., opening switch 210) during calibration operations may serve to decouple scaler 208 from subtractor 212. Decoupling scaler 208 from subtractor 212 ensures that subtractor 212 can generate an output that is proportional to the dark leakage current associated with photodiode 202.

During normal operation, switch 210 is placed in the on state (i.e., by closing switch 210) to switch scaler 108 into use. When switch 210 is closed, subtractor 212 will be configured to subtract Dleak from Dtotal to remove any leakage contribution from the total detected photodiode current level. Signal Dout may therefore represent a leakage-compensated ambient light sensor output value. Signal Dout may be temporarily stored in a storage element such as data register 214 for later retrieval. For example, data stored in register 214 may be read out by components 94 within device 10 when determining whether to adjust the brightness of display 14 based on ambient light levels (see, FIG. 3).

The circuitry of FIG. 5 is merely illustrative and does not serve to limit the scope of the present invention. If desired, the circuitry of FIG. 5 (e.g., photodiode 202, temperature sensor 204, ADC 206, digital scaler 208, subtractor 212, etc.) may be formed within a single integrated circuit or as part of multiple integrated circuits. Any suitable type of analog-to-digital converters and digital subtracting circuit may be used. Scaler 208 may be implemented using a finite-state machine or other programmable or application-specific control circuitry.

Figure 7:
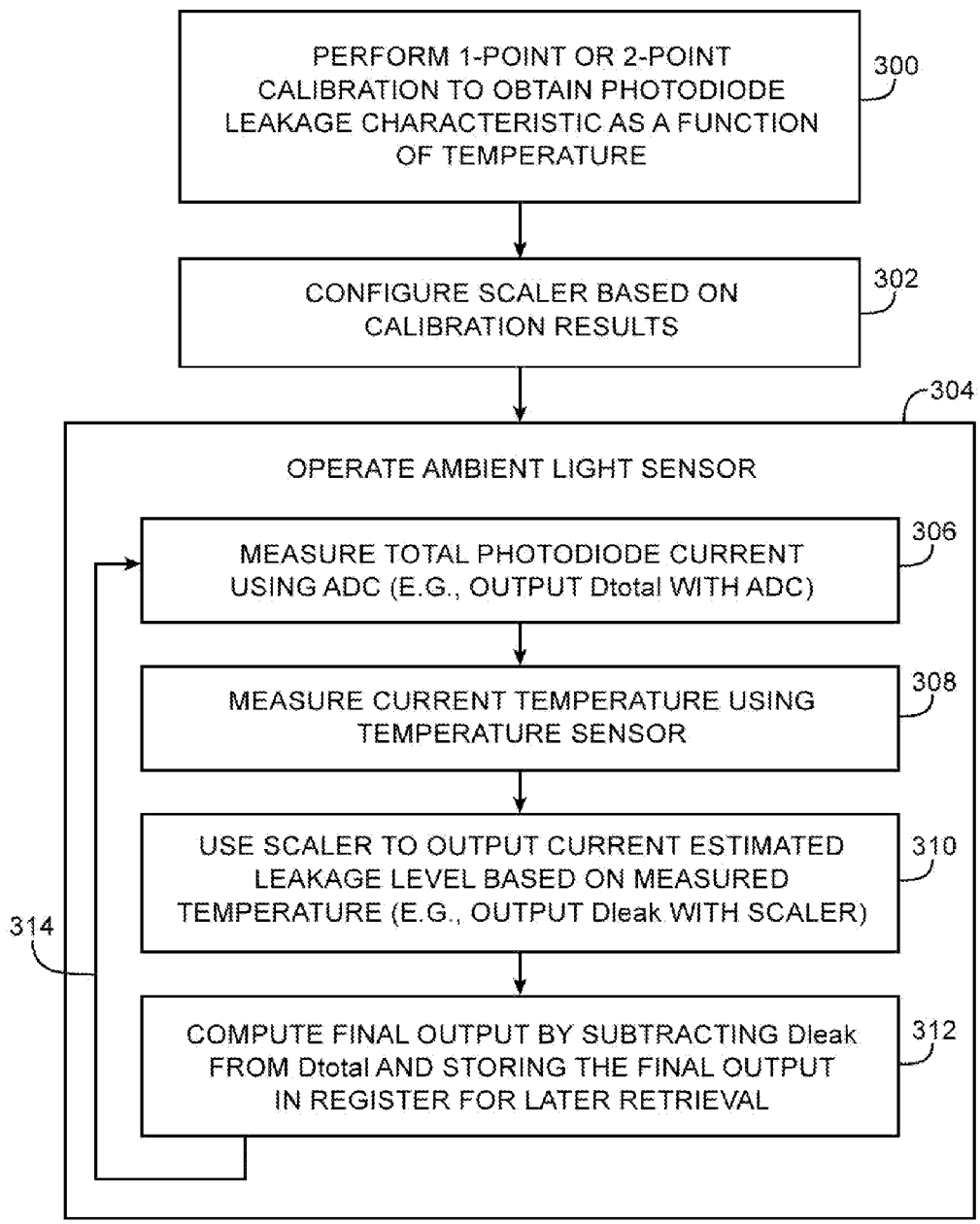
FIG. 7 is a flow chart of illustrative steps involved in operating an ambient light sensor of the type shown in FIG. 5 in accordance with an embodiment of the present invention.

FIG. 7 shows illustrative steps involved in operating an ambient light sensor 52 of the type described in connection with FIG. 5. At step 300, one-point or two-point calibration operations may be performed to characterize the leakage behavior of photodiode 202 (e.g., to obtain characteristic leakage curve 250 of FIG. 6). At step 302, scaler 208 may be configured based on the calibration results (e.g., by populating a look-up table or deriving a formula based on the measured calibration data points).

The ambient light sensor 52 may then be placed in normal operation (step 304). In particular, analog-to-digital converter 206 may sense the total photodiode current and output a corresponding code Dtotal (step 306). At step 308, temperature sensor 204 may be used to measure the current temperature of ambient light sensor 52. At step 310, scaler 208 may receive the temperature measurement from sensor 204 and output a corresponding estimated leakage code Dleak (e.g., by referred to the look-up table or using the formula derived during step 302). At step 312, subtractor 212 may used to compute a final leakage-current-compensated output code Dout (e.g., by subtracting Dleak from Dtotal) and storing Dout in register 214 for later retrieval. Signal Dout may be periodically updated or updated in response to certain user inputs, as indicated by path 314.

Figure 8:
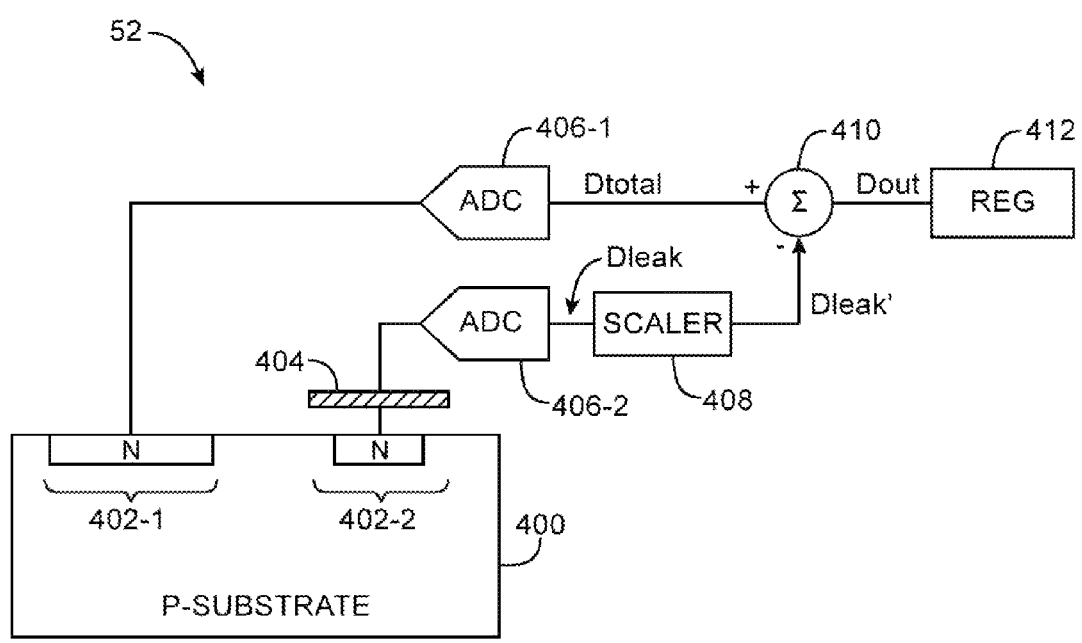
FIG. 8 is a diagram of an illustrative ambient light sensor that includes two photodiodes of different sizes and associated scaler circuitry in accordance with an embodiment of the present invention.

In another suitable arrangement, ambient light sensor 52 may include photosensitive elements of different sizes. FIG. 8 is a diagram of ambient light sensor 52 that includes a first photosensitive element such as photodiode 402-1 having a first size and a second photosensitive element such as photodiode 402-2 having a second size that is smaller than the first size (e.g., second photodiode 402-2 may occupy less die area than first photodiode 402-1). As an example, photodiode 402-2 may be half the size of photodiode 402-1. As another example, photodiode 402-2 may be a quarter of the size of photodiode 402-1. As yet another example, photodiode 402-2 may be an eighth of the size of photodiode 402-1. In general, photodiode 402-2 may have a size that is any suitable fraction of photodiode 402-1. The ratio of the size of photodiode 402-1 to photodiode 402-2 may be referred to herein as a scaling factor. For example, in the example above where photodiode 402-2 is an eighth of the size of photodiode 402-1, the scaling factor is equal to eight.

As shown in FIG. 8, a light blocking layer such as layer 404 may be formed over photodiode 402-2. Blocking layer 404 may serve to prevent light from reaching photodiode 402-2 and may be formed using metal or other material that is opaque to light. Since light cannot reach photodiode 402-2, photodiode 402-2 may be used to sense the amount of dark leakage current at any given operating condition. As a result, calibration operations described in connection with the temperature sensing approach need not be performed.

First photodiode 402-1 may be coupled to a first analog-to-digital converter 406-1, whereas second photodiode 402-2 may be coupled to a second analog-to-digital converter 406-2. Data converter 406-1 may have an input that receives a total current generated by photodiode 402-1 (i.e., a total current that includes both current Iphoto generated in response to incoming light and dark current Ileak) and an output on which corresponding signal Dtotal is provided. Data converter 406-2 may have an input that receives a leakage current generated by photodiode 402-2 and an output on which corresponding signal Dleak is provided. In scenarios in which photodiode 402-1 is larger than photodiode 402-2, the resolution of ADC 406-2 should be greater than the resolution of ADC 406-1.

In general, photodiode leakage current is proportional to the size of a photodiode (i.e., smaller photodiodes generate less leakage). Since photodiode 402-2 is smaller than photodiode 402-1, Dleak may be increased using a scaler 408. For example, scaler may receive Dleak and output a scaled version of Dleak (indicated as Dleak') that estimates (or mimics) the amount of leakage that is present in photodiode 402-1. Signal Dleak' may be computed by taking the product of Dleak and the scaling factor of the two photodiodes. For example, consider a scenario in which photodiode 402-2 is four times smaller than photodiode 402-1. In this example, scaler 408 may compute Dleak' by multiplying Dleak by a scaling factor of four. The scaling factor need not be an integer and can have any predetermined value (e.g., any value that is empirically set by the manufacturing process).

Ambient light sensor 52 of FIG. 8 may include a subtraction circuit 410 having a first (+) input configured to receive signal Dtotal from ADC 406-1, a second (−) input configured to receive scaled leakage signal Dleak' from ADC 406-2 via scaler 408, and an output on which final leakage-compensated ambient light sensor output signal Dout is provided. Signal Dout may be temporarily stored in a storage element such as data register 412 for later retrieval.

The circuitry of FIG. 8 is merely illustrative and does not serve to limit the scope of the present invention. If desired, the circuitry of FIG. 8 (e.g., photodiodes 402-1 and 402-2, ADCs 406-1 and 406-2, digital scaler 408, circuit 410, register 412, etc.) may be formed within a single integrated circuit or as part of multiple integrated circuits.

Figure 9:
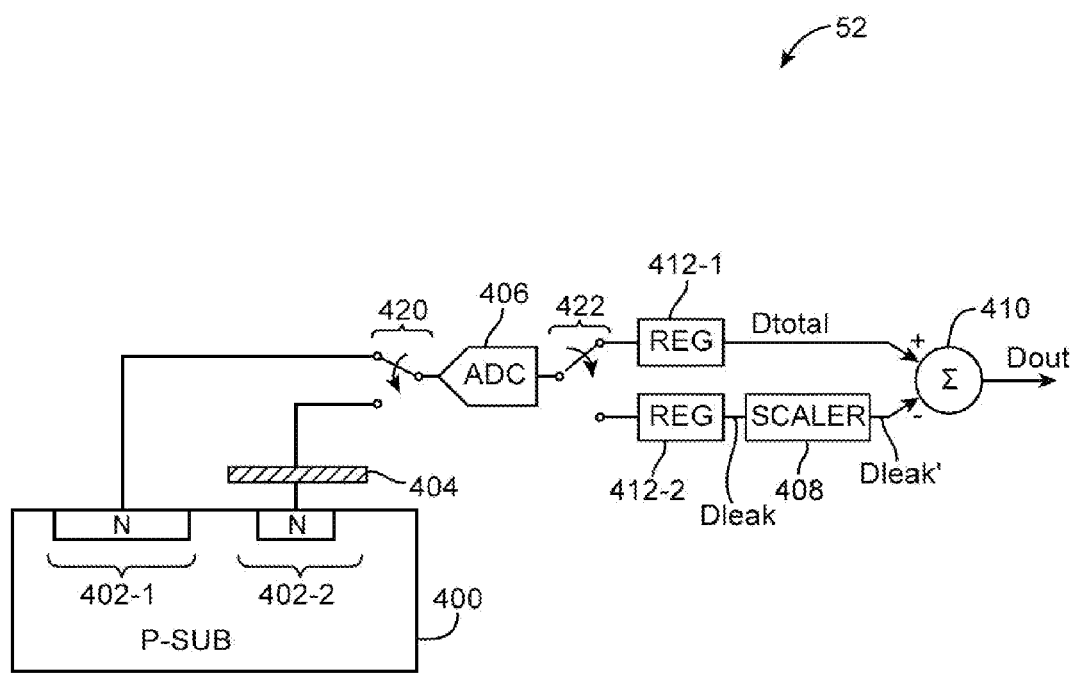
FIG. 9 is a diagram of an illustrative ambient light sensor that includes time-multiplexing circuitry in accordance with an embodiment of the present invention.

Ambient light sensor 52 of the type described in connection with FIG. 8 can also be implemented using a single analog-to-digital converter 406 (see, e.g., FIG. 9). As shown in FIG. 9, photodiodes 402-1 and 402-2 may be coupled to a shared ADC 406 via a first time-multiplexing switch 420. In particular, switch 420 may have a first port that is connected to photodiode 402-1, a second port that is connected to photodiode 402-2, and a third port that is connected to an input of ADC 406. Switch 420 may be placed in a first state during which the third port is coupled to the first port (while the second port is left floating) or may be placed in a second state during which the third port is coupled to the second port (while the first port is left floating). In other words, ADC 406 may be switchably coupled to a selected one of photodiodes 402-1 and 402-2 via time-multiplexing switch 420.

Converter 406 may have an output that is coupled to a first register 412-1 and a second register 412-2 via another time-multiplexing switch 422. In particular, switch 422 may have a first port that is connected to the output of ADC 406, a second port that is connected to register 412-1, and a third port that is connected to register 412-2. Switch 422 may be placed in a first state during which the first port is coupled to the second port (while the third port is left floating) or may be placed in a second state during which the first port is coupled to the third port (while the second port is left floating). Register 412-1 may be coupled to the first (+) input of subtractor 410, whereas register 412-2 may be coupled to the second (−) input of subtractor 410 via scaler 408. In other words, the first input of subtractor 410 may be switchably coupled to shared ADC 406 via first register 412-1, whereas the second input of subtractor 410 may be switchably coupled to shared ADC 406 via second register 412-2 and scaler 408.

Ambient light sensor 52 of this type may be operated in a time-multiplexed fashion. When switches 420 and 422 are placed in the first state, ADC 406 may serve to receive current from photodiode 402-1 and generate a corresponding signal Dtotal that is latched using register 412-1. When switches 420 and 422 are placed in the second state, ADC 406 may serve to receive current from photodiode 402-2 and generate a corresponding signal Dleak that is latched using register 412-2. Switches 420 and 422 (and sometimes registers 412-1 and 412-2) may be referred to as time-multiplexing control circuitry. Scaler 408 may then compute and output Dleak'. Once registers 412-1 and 412-2 have latched Dtotal and Dleak', respectively, subtractor 410 may compute and output final leakage-compensated ambient light sensor signal Dout (e.g., Dout may be computed by subtract Dleak' from Dtotal).

The circuitry of FIG. 9 is merely illustrative and does not serve to limit the scope of the present invention. If desired, the circuitry of FIG. 9 (e.g., photodiodes 402-1 and 402-2, shared ADC 406, registers 412-1 and 412-2, digital scaler 408, circuit 410, etc.) may be formed within a single integrated circuit or as part of multiple integrated circuits.

Figure 10:
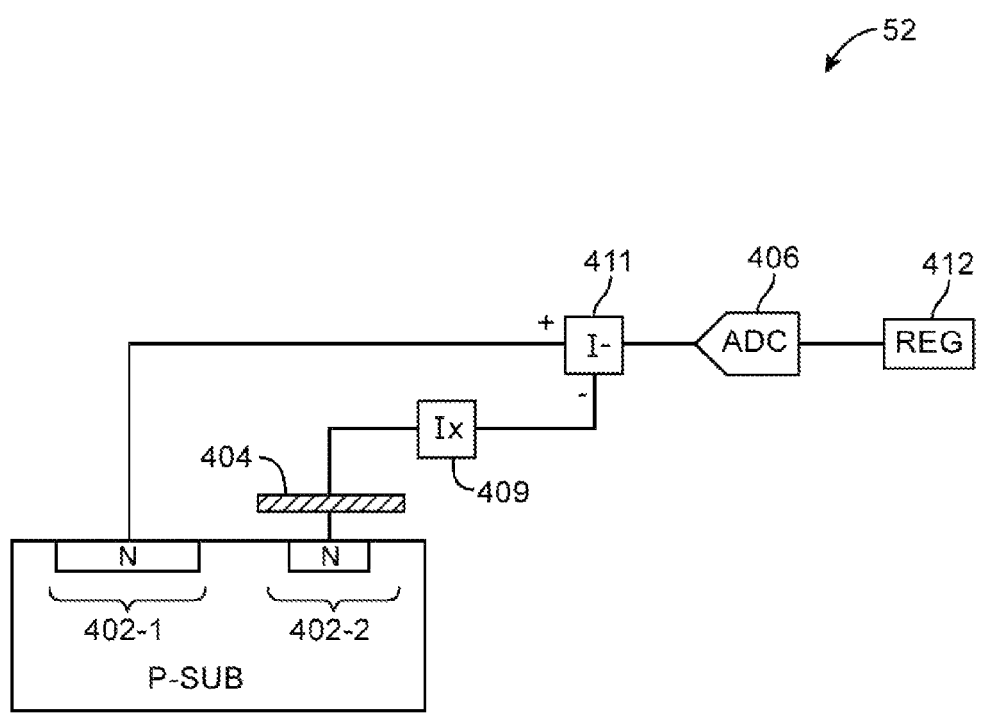
FIG. 10 is a diagram of an illustrative ambient light sensor that includes analog scaler and subtraction circuitry in accordance with an embodiment of the present invention.

In yet another suitable arrangement, the scaling operation and the subtraction operation may be performed in the analog domain (see, e.g., FIG. 10). As shown in FIG. 10, photodiode 402-1 may be coupled to a first (+) input terminal of analog subtraction circuit 411, whereas photodiode 402-2 may be coupled to a second (−) input terminal of circuit 411 via an analog scaler circuit 409. Scaler 409 may be implemented using as a current mirror circuit with a suitable mirroring current ratio (e.g., a mirroring ratio that is equal to the scaling factor). Subtraction circuit 411 may be implemented using any suitable current subtraction circuit.

Configured in this way, subtraction circuit 411 may receive a total current at its first input, a scaled leakage current at its second input, and may produce a corresponding net current at its output (e.g., a net current that is equal to the total current minus the leakage current). The net current may then be fed to ADC 406 for conversion into its digital equivalent. The converted digital signal may represent the final leakage-compensated ambient light sensor signal, which may temporarily be stored in register 412.

The circuitry of FIG. 10 is merely illustrative and does not serve to limit the scope of the present invention. If desired, the circuitry of FIG. 10 (e.g., photodiodes 402-1 and 402-2, analog scaler 409, analog current subtractor 411, ADC 406, register 412, etc.) may be formed within a single integrated circuit or as part of multiple integrated circuits.

Figure 11:
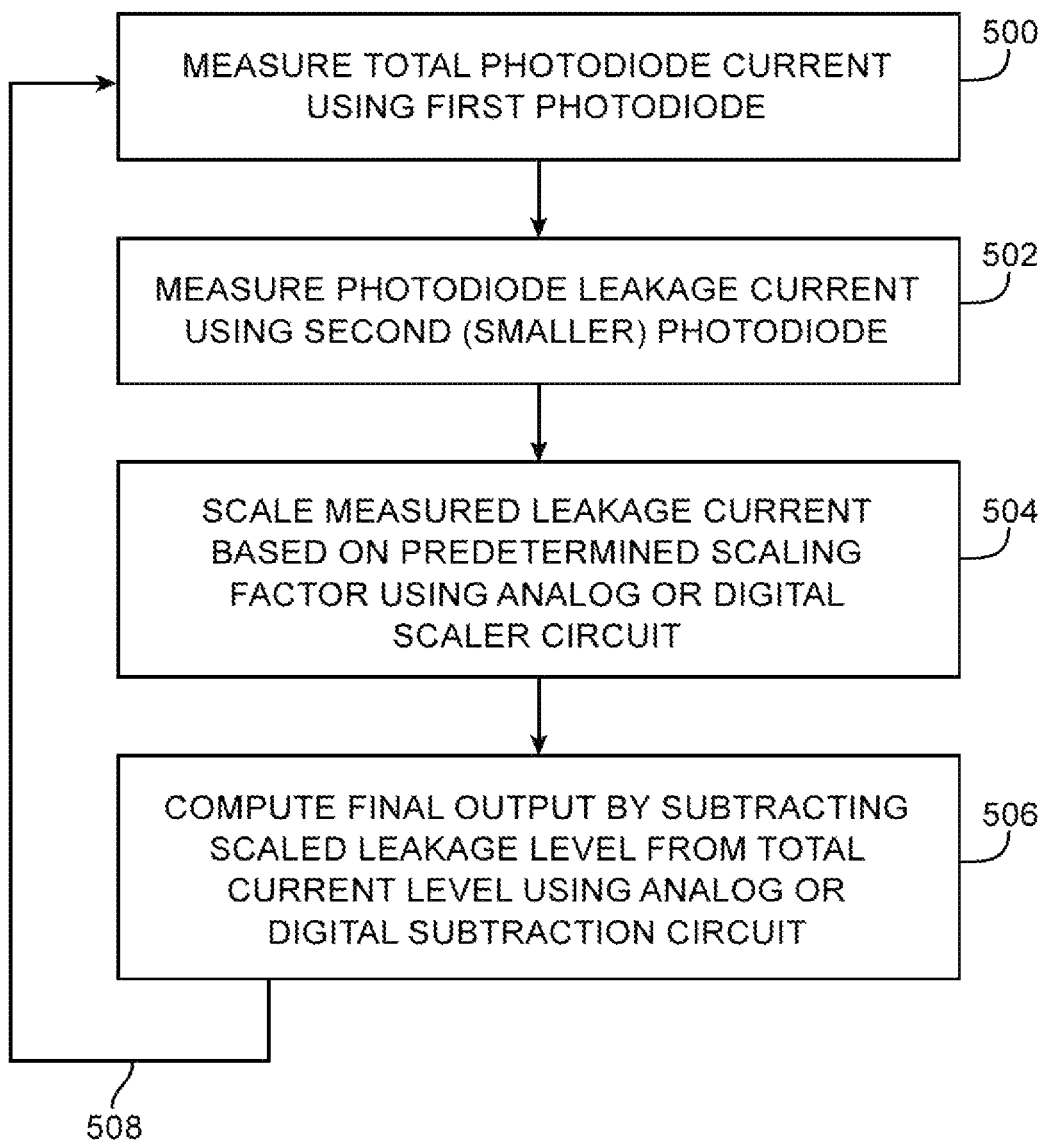
FIG. 11 is a flow chart of illustrative steps involved in operating ambient light sensors of the types shown in FIGS. 8-10 in accordance with an embodiment of the present invention.

FIG. 11 is a flow chart of illustrative steps involved in operating ambient light sensors 52 of the type described in connection with FIGS. 8-10. At step 500, first photodiode 402-1 may be used to measure a total current value. At step 502, second photodiode 402-2 may be used to measure a leakage current value. Steps 500 and 502 may be performed in parallel.

At step 504, the leakage current obtained from second photodiode 402-2 may be scaled based on a predetermined scaling factor using a digital scaler (as described in connection with FIGS. 8 and 9) or an analog scaler (as described in connection with FIG. 10). At step 506, a final leakage-compensated ambient light sensor output signal may be computed by subtracting the scaled leakage current value from the total current value using a digital subtraction circuit (as described in connection with FIGS. 8 and 9) or an analog subtraction circuit (as described in connection with FIG. 10).

Any suitable analog-to-digital conversion circuitry may be used during steps 504 and 506 to convert the analog current values generated from the two photodiodes into corresponding digital values. Processing may then loop back to step 500 to (a) periodically update the ambient light sensor output, as indicated by path 508.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. An electronic device, comprising:
    an ambient light sensor that includes a photosensitive element and a temperature sensor, wherein the ambient light sensor is configured to generate a leakage-compensated output signal based only on information gathered from the photosensitive element and the temperature sensor; and
    a display having an adjustable brightness level, wherein the brightness of the display is adjusted based only on the leakage-compensated output signal.

2. The electronic device defined in claim 1, wherein the photosensitive element comprises a photodiode.

3. The electronic device defined in claim 1, wherein the ambient light sensor further includes:
    a scaler circuit that receives a temperature sensor output signal from the temperature sensor, wherein the scaler circuit produces a corresponding scaled leakage current signal based on the temperature sensor output signal.

4. The electronic device defined in claim 3, wherein the ambient light sensor further includes:
    an analog-to-digital converter having an input that is coupled to the photosensitive element and an output on which a corresponding total current signal is provided.

5. The electronic device defined in claim 4, wherein the ambient light sensor further includes:
    a subtraction circuit having a first input that receives the total current signal from the analog-to-digital converter, a second input that receives the scaled leakage current signal from the scaler circuit, and an output on which the leakage-compensated output signal is provided.

6. The electronic device defined in claim 5, wherein the ambient light sensor further includes:
    a switching circuit coupled between the scaler circuit and second input of the subtraction circuit, wherein the switching circuit is turned off during calibration operation and is turned on during normal operation.

7. The electronic device defined in claim 1, wherein the ambient light sensor further includes:
    a scaler circuit that receives a temperature sensor output signal from the temperature sensor and that produces a corresponding scaled leakage current signal based on a look-up table.

8. The electronic device defined in claim 1, wherein the information comprises ambient light level and temperature information.

9. A method of adjusting display brightness for a display in an electronic device that has an ambient light sensor while the electronic device is operated in an environment in which the electronic device is exposed to ambient light, the method comprising:

- measuring a total ambient light level for the ambient light with a photosensitive element in the ambient light sensor;
- obtaining temperature information on the ambient light sensor with a temperature sensor in the ambient light sensor;
- outputting a leakage-compensated ambient light sensor output signal based only on the total ambient light level and the temperature information; and
- adjusting display brightness for the display based only on the leakage-compensated ambient light sensor output signal.

10. The method defined in claim 9, further comprising:
obtaining a leakage level associated with the photosensitive element based only on the temperature information, wherein outputting the leakage-compensated ambient light sensor output signal comprises computing a difference between the total ambient light level and the leakage level.

11. The method defined in claim 9, further comprising:
obtaining a leakage level associated with the photosensitive element based on a look-up table.

12. The method defined in claim 9, further comprising:
computing a leakage level associated with the photosensitive element based on a formula derived from measurements obtained during calibration operations.

* * * * *